US007753748B2

(12) United States Patent
Gai et al.

(10) Patent No.: US 7,753,748 B2
(45) Date of Patent: Jul. 13, 2010

(54) CONTROL DEVICE FOR SAILBOATS

(75) Inventors: Giorgio Gai, Genoa (IT); Alessandro Staiolo, Ronco Scrivia (IT)

(73) Assignee: Ultraflex SpA, Casella (GE) (IT)

( * ) Notice: Subject to any disclaimer, the term of this patent is extended or adjusted under 35 U.S.C. 154(b) by 94 days.

(21) Appl. No.: 12/186,513

(22) Filed: Aug. 6, 2008

(65) Prior Publication Data

US 2009/0047848 A1 Feb. 19, 2009

(30) Foreign Application Priority Data

Aug. 14, 2007 (IT) .......................... GE2007A0080

(51) Int. Cl.
*B60W 10/04* (2006.01)

(52) U.S. Cl. .......................................... 440/84; 440/87

(58) Field of Classification Search .................. 440/84, 440/87

See application file for complete search history.

(56) References Cited

U.S. PATENT DOCUMENTS 4,362,516 A * 12/1982 Lyons ......................... 440/85
5,564,955 A 10/1996 Ingraham
2007/0249244 A1* 10/2007 Watanabe et al. ............. 440/84

* cited by examiner

*Primary Examiner*—Stephen Avila
(74) *Attorney, Agent, or Firm*—Themis Law

(57) ABSTRACT

A control device for boats, particularly sailboats, includes a control member, which regulates the operating conditions of an operating unit such as a motor, and which can be moved along a predetermined path and for a predetermined range between two extreme stop positions. The device is configured to be coupled to a linkage or tie rod system and/or displacement and/or position electric/electronic sensors, such that a movement of the control member causes a corresponding movement of a member regulating the operating unit. The control member includes a handle extension movable between an actuating operative position, in which the handle extension is deployed, and a non-operative position, in which the extension is laid down and/or withdrawn to reduce overall dimensions.

25 Claims, 7 Drawing Sheets

CONTROL DEVICE FOR SAILBOATS

FIELD

The invention relates to a control device for boats such as sailboats, and, more generally, to a control device suitable for remotely controlling drives and operation of equipment, including marine and earth based equipment.

BACKGROUND

Control devices are currently used in boats, for example, for regulating operating conditions of motors through control members such as levers, which can be moved along a predetermined path and for a predetermined range between two extreme stop positions. Typically, these levers or other control members are mechanically coupled, for example through a linkage, a tie rod system, or flexible cables, to means for movably regulating the operating conditions of one or more motors, for example a throttle valve or a shift. These types of devices are generally mounted on the bridge of the boat in the proximity of the steering wheel.

In sailboats, the motor is used to support navigation during dead calm, for performing mooring maneuvers, or for providing a reference rate during sailing. Unfortunately, each control device of the motor causes an area of obstruction during sailing maneuvers. For example, control levers of these types of devices are surfaces against which crew members may bump and be injured, for example during the agitated wearing phase, and in which ropes may be tangle and get caught, hindering the operation of the sailboat during sudden maneuvers and compromising crew safety.

SUMMARY

It is an object of the present invention is to provide a control device for boats, particularly for sailboats, that simply and reliably overcome the above described drawbacks at least to some degree.

The present invention achieves its object by providing a device that includes a control member, which regulates the operating conditions of an operating unit such as a motor, and which can be moved along a predetermined path and for a predetermined range between two extreme stop positions. The device of the present invention is configured to be coupled to a linkage or tie rod system and/or displacement and/or position electric or electronic sensors, such that a movement of the control member causes a corresponding movement of a member regulating the motor. In one embodiment, the control device of the present invention includes a handle extension that can be moved between an actuating operative position, in which the handle extension is deployed, and a non-operative position, in which the handle extension is laid down and/or withdrawn to reduce device dimensions.

A control device according to the present invention can be dimensioned to occupy a very small space while keeping the same functionalities of known devices. When the motor is not in use, for example, when sailing, the control member (typically a lever) can be positioned in its non-operative position, and when the lever is deployed and is operated in the shift, throttle or acceleration positions if neutral it is not possible, the control member can be positioned to a position having the smallest overall dimension. Means for locking the lever when it is in such position may also be provided, for example, automatic means, and may include inserts preventing the lever from being pivoted or slid when rotated in the forward/backward position or acceleration position if in neutral.

The device preferably includes two parts, a first part being fixed and mountable on a wall, for example a lateral wall of a sailboat cockpit and/or on a bridge of a boat, and a second movable part being rotatably coupled to the first part to rotate with respect to the first part. The angular displacement of the second part with respect to the first part causes a regulating members to be correspondingly controlled for being moved. In order to provide for an easy rotation, a handle extension is eccentrically integral with the second movable part, acting as a lever when in its operative actuating position. Thus, the user can act on the lever in a usual manner to set the desired regulation. When moving the lever is not necessary, the lever can be stored, for example, tilted and/or inserted by a telescopic sliding movement, in the non-operative position where it is laid down on the movable part, into or to the side of it according to advantageous embodiments of the same inventive concept. Then, by giving the device a suitable shape and/or by advantageously using a single lever with a button for controlling both the throttle and the shift of the motor or motors, the overall dimension of the device can be further reduced, thus reducing the provision of elements, to which ropes can become entangled.

In an embodiment of the invention, the handle extension is hinged at one end of the movable part for enabling a pivotable opening/closing movement with respect to the movable part, the non-operative position of the lever corresponding to the closed position, in which an extension of the lever rests or anyway is laid down or tilted on the movable part, preferably into a groove, an indentation or a recess housing the extension, and the operative position corresponding to the opened position, in which the extension is outwardly tilted or spread making a lever.

Advantageously, there are provided releasable engaging means, for example in the form of a movable tooth that engages a corresponding groove of a hinge member, and a button that disengages said tooth when operated, stopping the mutual movement of the movable part and of the handle extension in one or more positions, particularly when the parts are closed. The button can be associated to the handle extension or to the movable part in any positions. In order to further reduce overall dimensions, the button can be arranged on the surface upon which the handle extension abuts, that is, where it rests or lays down. The extension may include has a slot in a position coinciding with said button, making it possible to reach the button when the device is closed.

In another embodiment, the movable part and the handle extension are slidably coupled together such that the extension can assume any intermediate positions between a completely or partially deployed or extended position, and a position completely or partially withdrawn into a sliding seat provided in the movable part. The non-operative position corresponds to the completely or partially withdrawn position, that is, the extension can completely or partially be withdrawn or inserted into a housing and the handle extension or a rod thereof can be slidably and axially engaged. The operative position then corresponds to a completely or partially deployed or extended position from a housing, in which the handle extension or a rod thereof are axially and slidably engaged.

In operation, the lever, in particular, the handle extension and the rod associated thereto, is not opened and closed by a tilting movement, but it is deployed to reach the operative position by sliding a rod of the lever into the movable part or in the element associated thereto. Advantageously, the movable part has a housing that can be reached by an inlet, within which the rod or a part of the handle extension having similar functionalities is slidably guided when moving from the non-operative position to the operative position and vice versa. The housing can be sized to partially receive the handle extension, namely, the rod thereof when the handle extension is in the withdrawn position. In this configuration, the housing can be a through opening, a guide or a recess open at head ends, and the extension extends from the inlet, for example by abutting against an element of the fixed part.

Alternatively, the housing can be sized to completely receive the handle extension when the handle extension is in the withdrawn position. Means for removing the extension from the housing can be provided, such as a snap mechanism, a releasable spring system and/or a button, the extension being hiddenly inserted into the housing against the action of the removing means.

Preferably, the extension includes a handle with a shape that is complementary to the shape of the movable part, harmonically joining to the movable part when the extension is in its withdrawn position and providing both a technically effective and an aesthetically pleasing result. In order to give the user a wider support surface, the handle can be oriented, for example rotated, substantially at 90° and along a plane substantially orthogonal to a longitudinal section plane of the device.

In alternative or in combination, the handle extension may be configured as a telescopically deployed/compressed lever, completely received into a housing of the movable part that has a longitudinal dimension less than the longitudinal extension of the lever.

In an embodiment of the invention, the movable part and the handle extension each have a shape that is a part or a sector of a three-dimensional shape, the two parts or two sectors related to the movable part and to the handle extension being such that when the handle extension is in the withdrawn or non-operative condition, the shapes of the handle extension and of the movable part complete each other to form the three-dimensional shape.

The fixed part of the device may include a housing configured to receive a corresponding insert of the handle extension such that, in the non-operative position, the movable part is prevented from rotating in relation to the fixed part. This design prevents the device from being accidentally moved when in the non-operative position and provides a greater safety level when handling the device.

In an embodiment of the invention, the device controls one or more motors through a single control member, typically a lever, which is configured for transmitting both acceleration and deceleration controls and for driving the shift by a mechanism which transmits control or controls and which is coupled to the control member. In this embodiment, the device includes a button for disengaging the control member from the mechanism transmitting the control to the shift, allowing the motor or motors to be accelerated or decelerated when in the neutral condition. This design configuration enables a further reduction of the overall device dimension, but a configuration can also be provided with at least two control members for transmitting acceleration or deceleration controls and for driving the shift respectively through control transmitting mechanisms coupled thereto.

Another aspect of the invention relates to a system for controlling a motor of a boat, particularly a sailboat, which includes a control device as described above, and a mechanical, electromechanical, fluid dynamic and/or any other type of system for transferring control or controls from the device to member or members regulating the motor. More particularly, regulating members may act at least on a throttle valve or the like for regulating the acceleration and deceleration of the motor, or on a shift or other structure for regulating the coupling with the motor/propeller shaft.

Such system may comprise a single lever for controlling both the acceleration and deceleration, and the shift of the motor through a button disengaging the lever from the mechanism transmitting the control to the shift, allowing the motor or motors to be accelerated or decelerated when in neutral.

Alternatively, the system can include two levers able to independently control the acceleration and deceleration and the shift of the motor.

A further aspect of the invention relates to a motorboat, which includes a control device as described above that is connected to a motor for controlling marine or earth based equipment. Marine equipment may include a boat, preferably a sailboat, which is provided with a motor driven by a control member placed in the cockpit.

Further characteristics and improvements are described and claims in the appended claims.

BRIEF DESCRIPTION OF THE FIGURES

Features and advantages of the invention will be made clearer from the following detailed description and from the annexed drawings, wherein.

DETAILED DESCRIPTION

Figure 1:
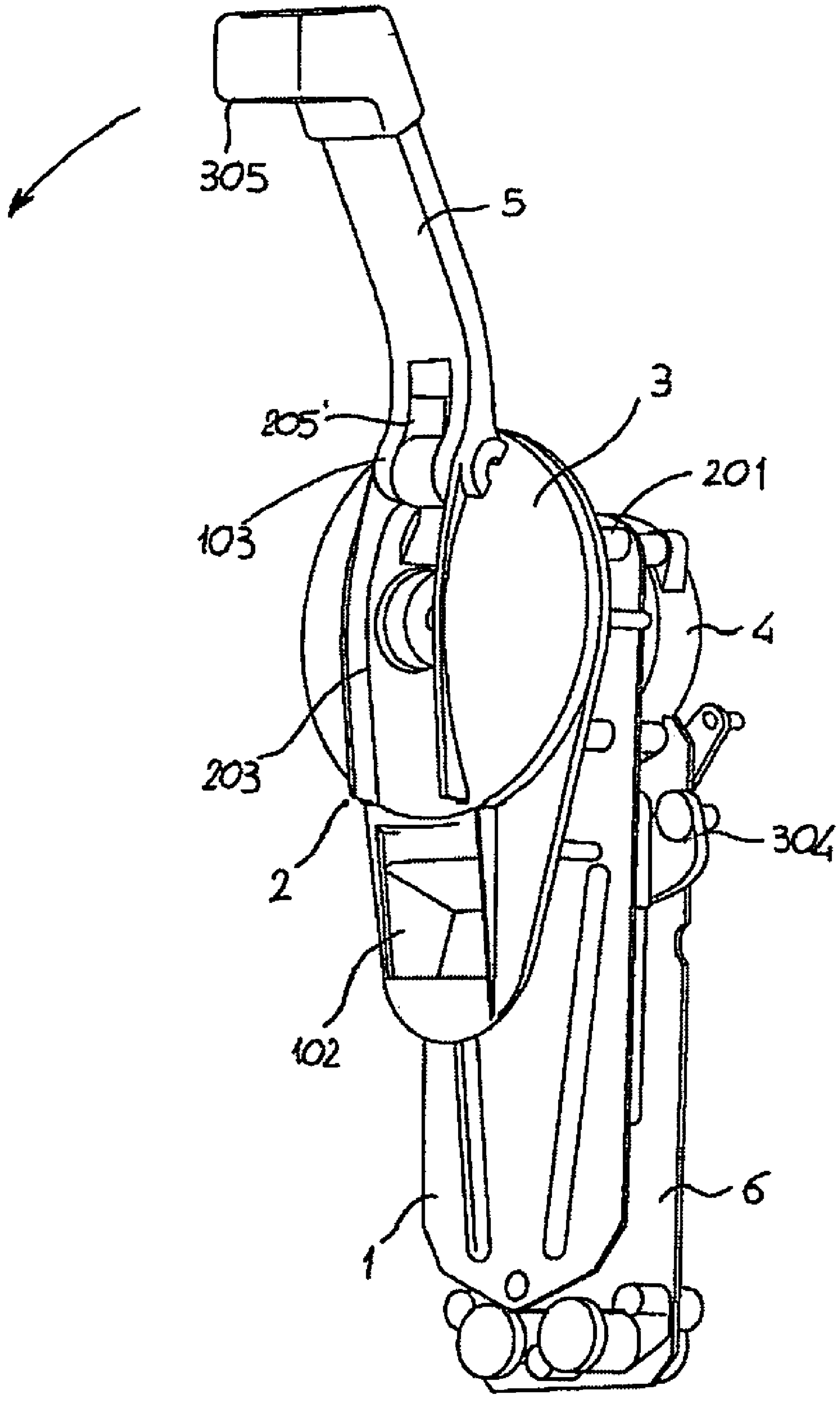
FIGS. 1 and 2 are perspective views of a first embodiment of the invention showing the device lever in operative and non-operative positions.
Figure 2:
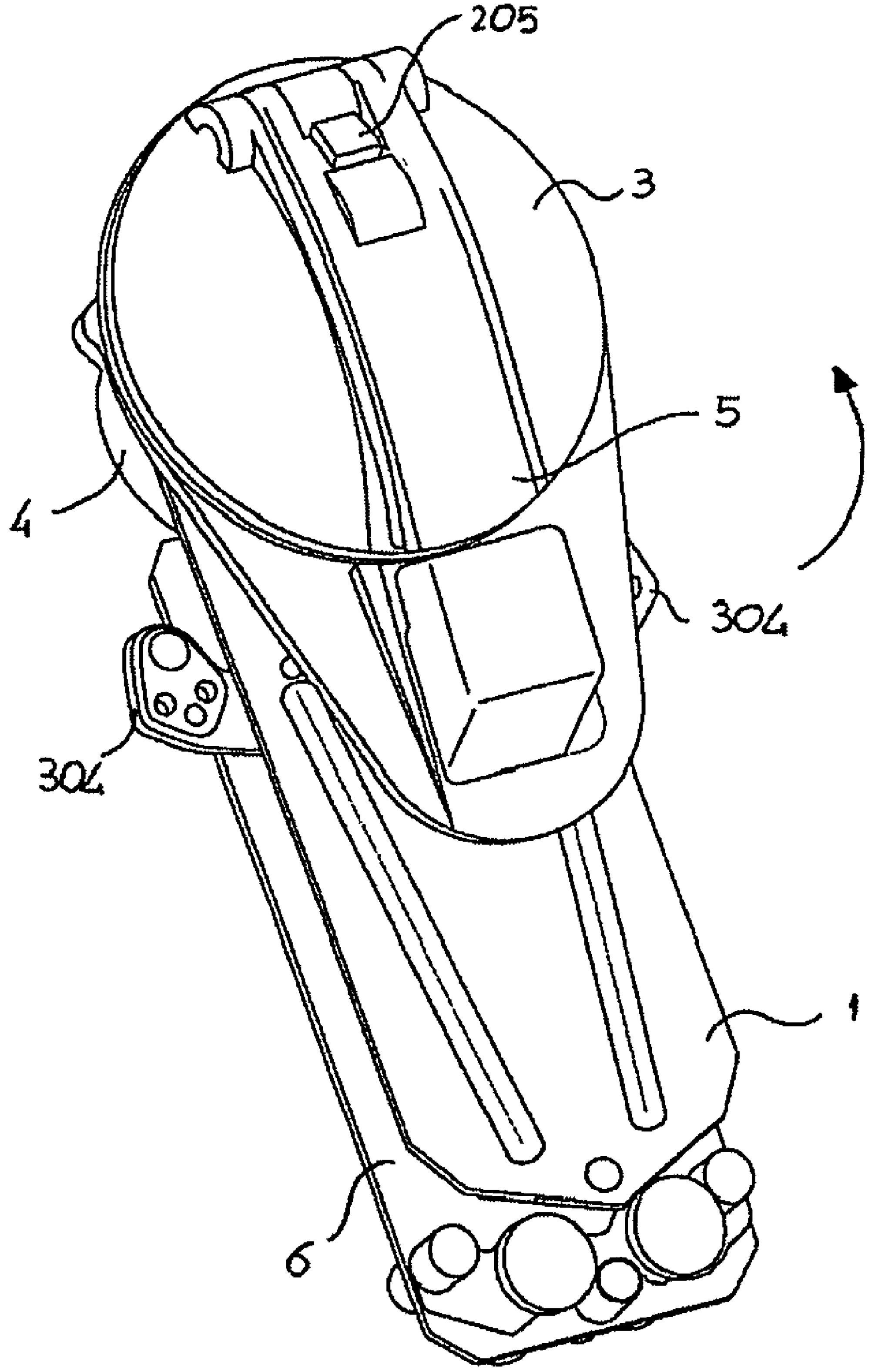
Figure 3:
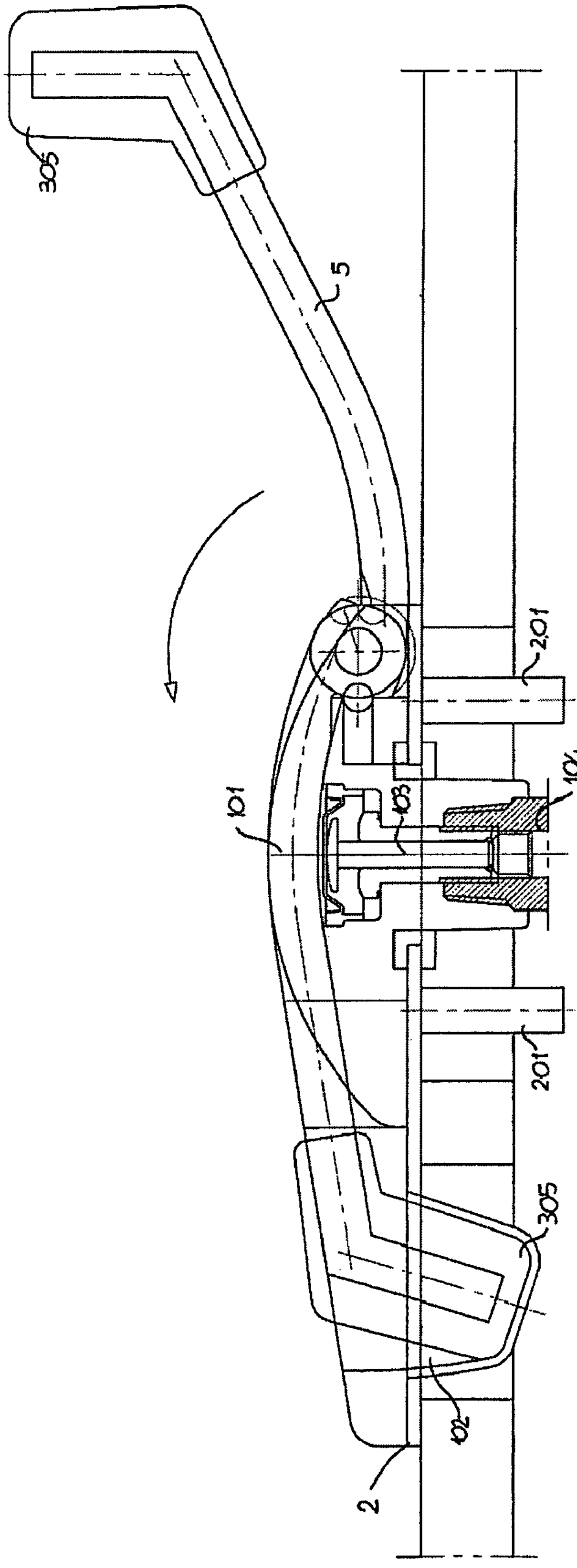
FIGS. 3 and 4 are side views of the device of FIGS. 1 and 2.
Figure 4:
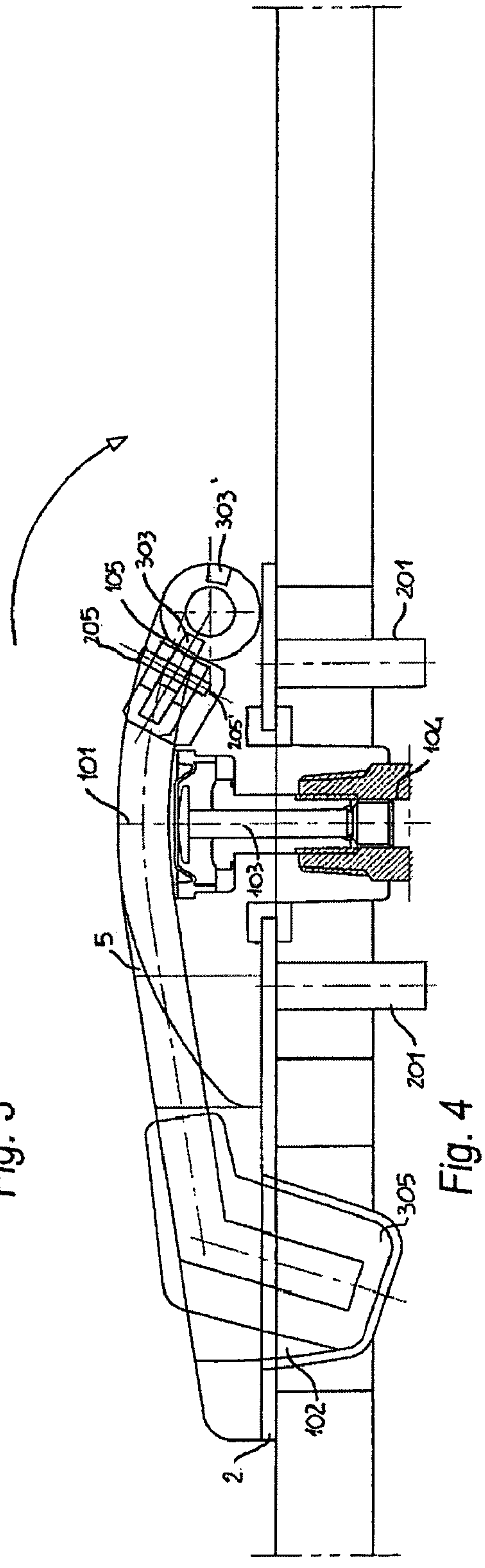

Detailed descriptions of embodiments of the invention are provided herein. It should be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

With reference to FIGS. 1 to 4, the control device is composed of a support 2, upon which the centrally pivoted cap-like body 3 is fitted such that it can rotate with respect to the support 2 about the axis 101. On the opposite side, the mechanism 4, coupled to the support 2 by spacers 201, is provided via the supporting sheet 1. A second sheet 6, firmly connected to the sheet 1, completes the device.

The mechanism 4 is a transmission gearbox transforming the angular motion of the shaft 104 into a corresponding motion of translation of levers 304, to which tie rods or flexible cables are coupled that reach the regulating member. Alternatively or in combination, the mechanism 4 can be an encoder. In such a case, there is a control unit interpreting and recognizing displacement signals through transducers associated to the encoder and generating corresponding control signals for an actuator coupled to the regulating member. According to a particularly advantageous embodiment, transmission means are a combination of the previously described transmission means, providing an electromechanical transmission, for example, according to the description in European Patent Application EP1541463.

The cap-like body 3 and the mechanism 4 are coupled by a pin 103' and possibly or in alternative by another fastener, such that a rotation of the cap-like body 3 causes the shaft 104 to correspondingly rotate. The cap-like body 3 in the center and for an entire diameter has a groove 203 intended to receive a lever 5 hinged at one end of the groove 203, i.e. of the peripheral edge of the cap-like body 3. The hinge 103 allows the lever to perform an opening and closing movement with respect to the cap 3, which movement in the present embodiment is the lever 5 being pivoted to tilt against the cap-like body 3, with the lever 5 being completely inserted at least for a portion of its length into the groove 203. The shape of the lever 5 is complementary to the shape of the groove 203, such that in the closed position the lever 5 is substantially hiddenly housed, while the outer surface of the lever 5 is joined to the outer surface of the cap-like body 3, in which the groove 203 is provided, making the cap-like body 3 complete. When opened, the lever 5 deploys at the opposite side with respect to the groove 203, in order to form an arm that is substantially equal to the length of the lever. More particularly, the lever 5 is outwardly and angularly disposed in an alignment position with the longitudinal axis of the groove and in a substantially radial position with respect to the shaft 104. By acting on the lever 5, a user can rotate the cap-like body 3 and so the shaft 104 of the mechanism 4. When it is not necessary to move the device, the lever can be put into the groove in order to reduce the overall dimension to a minimum.

At the hinge 103, into the lever 5 a mechanism for movably locking it at least in the outwardly overturned position, i.e. in the operative or active position, preferably for movably locking the lever also in the withdrawn or tilted position against the cap-like body 3 is provided. Advantageously, such mechanism is composed of a double button snap fit mechanism configured to releasably lock the lever 5 when in the closed or open position. The snap mechanism is composed of an insert 105 that is elastically forced to engage into corresponding slots 303, 303' of the fixed part of the hinge 103 associated to the cap 3. Slots 303, 303' are spaced such that they are placed by the insert 105 when the lever 5 is completely closed or completely open. A pair of buttons 205, 205' act transversally with respect to the insert 105, in order to allow the insert 105 to axially move against the action of spring means, thus disengaging the slots 303, 303'. The two buttons 205, 205' are placed on opposite sides of the lever 5 such that the user can always reach at least one of them.

The free end of the lever 5 has a substantially L-shaped handle 305 configured not only for effectively holding the lever 5, but also at allowing the lever 5 to be operated more safely. The support 2 has a corresponding recess 102 with the handle being fitted therein when the lever is in the closed position, preventing the device from being accidentally moved. More particularly, the lever 5 has such a length that the recess 102 housing the handle 305 is provided outside the peripheral edge of the cap-like body 3 and on the groove side opposite to the side where said lever 5 is hinged with said cap-like body 3.

Figure 6:
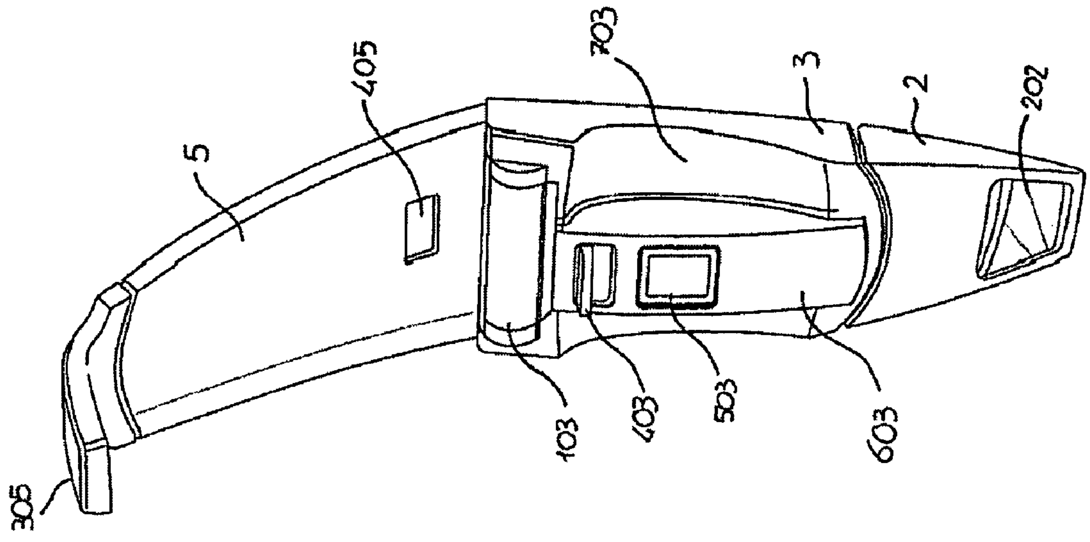
FIGS. 5 and 6 are perspective views of a second embodiment of the invention showing the device lever in operative and non-operative positions.
Figure 5:
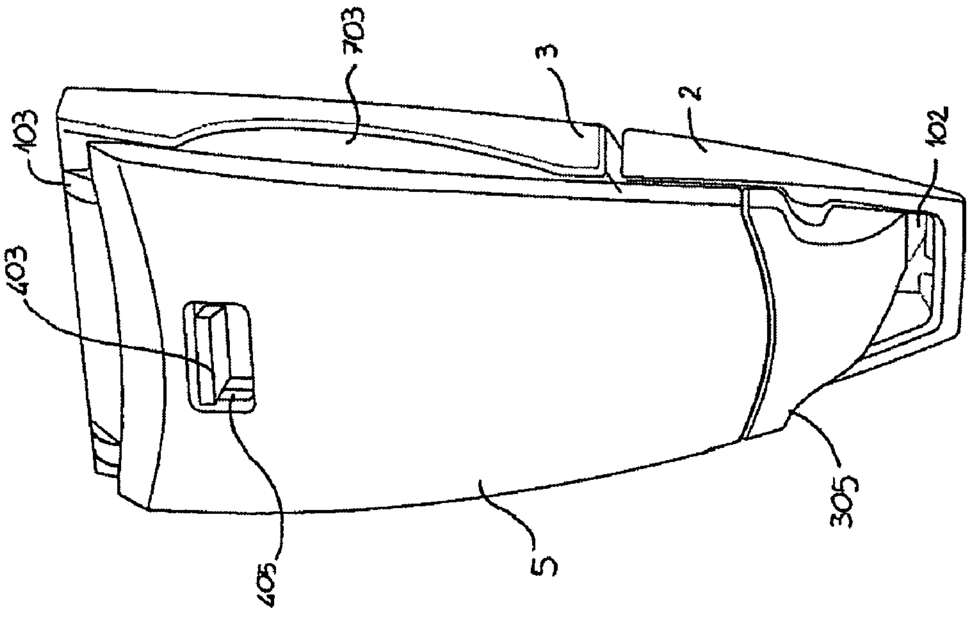

The device shown in FIGS. 5 and 6 is a variant of the device described above. The cap/lever assembly is composed of a centrally pivoted body 3 upon which the lever 5 rests or against which it abuts when it is in its withdrawn position to provide a kind of removable cover for the body 3, which cover is hinged to one end 103. The cover/lever 5 has a rounded shape, ending at its free end with a handle 305 that is substantially composed of an inwardly concave L-shaped extension which, in the closed position, engages a corresponding recess 102 of the fixed support 2. The movable body 3 has a central wall 603, upon which buttons 403 and 503 and two lateral indentations 703 are mounted for helping the user when opening the cover/lever 5.

The button 403 releases the lever 5 kept in the open and/or closed position from a snap fit mechanism (not shown) like the mechanism described with reference to the first embodiment. When the cover/lever 5 is closed, that is, when the lever 5 is tilted against the movable body 3, the slot 405 enables the user to reach the button 403. The button 503 is for powering an operating unit, for example, for accelerating a motor when in neutral condition. For the sake of simplicity, the operating unit will be exemplied hereinafter as a motor.

Thus, this device controls both the acceleration/deceleration and the shift of the motor through a single control member, that is, the lever 5. The shift is simply a device providing a forward and backward movement by coupling the motor to the propeller shaft. In single lever control devices, this type of movement is accomplished as follows. When the lever is in an upright position, the motor is idling. A forward or backward pivotal movement of the lever causes the forward gear or reverse gear to be engaged respectively in the idle condition, therefore, additional pivotal movements increase the revolutions of the motor in the in-gear condition. On the contrary, when the lever is put close to its central position, motor revolutions are progressively reduced and the gear is disengaged, leaving the motor in the neutral condition. Consequently, in such devices the motor cannot be accelerated when in the neutral condition, because when the lever is pivoted with respect to its upright position, the gear is also engaged. For such reason, in the illustrated device, the button 503 is provided for disengaging the device from the mechanism transmitting the control to the shift and allowing the motor to be accelerated/decelerated when in the neutral condition.

Figure 7:
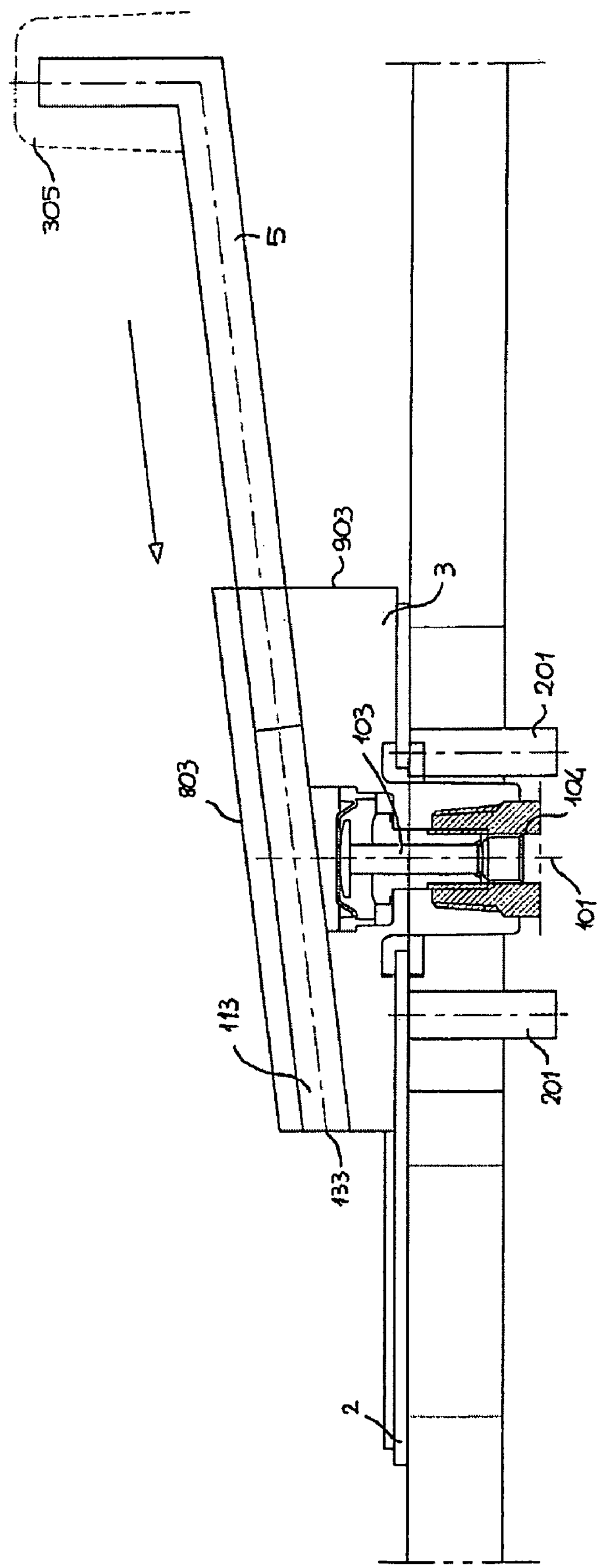
FIGS. 7 and 8 are side view of a third embodiment of the invention showing the device lever in operative and non-operative positions.
Figure 8:
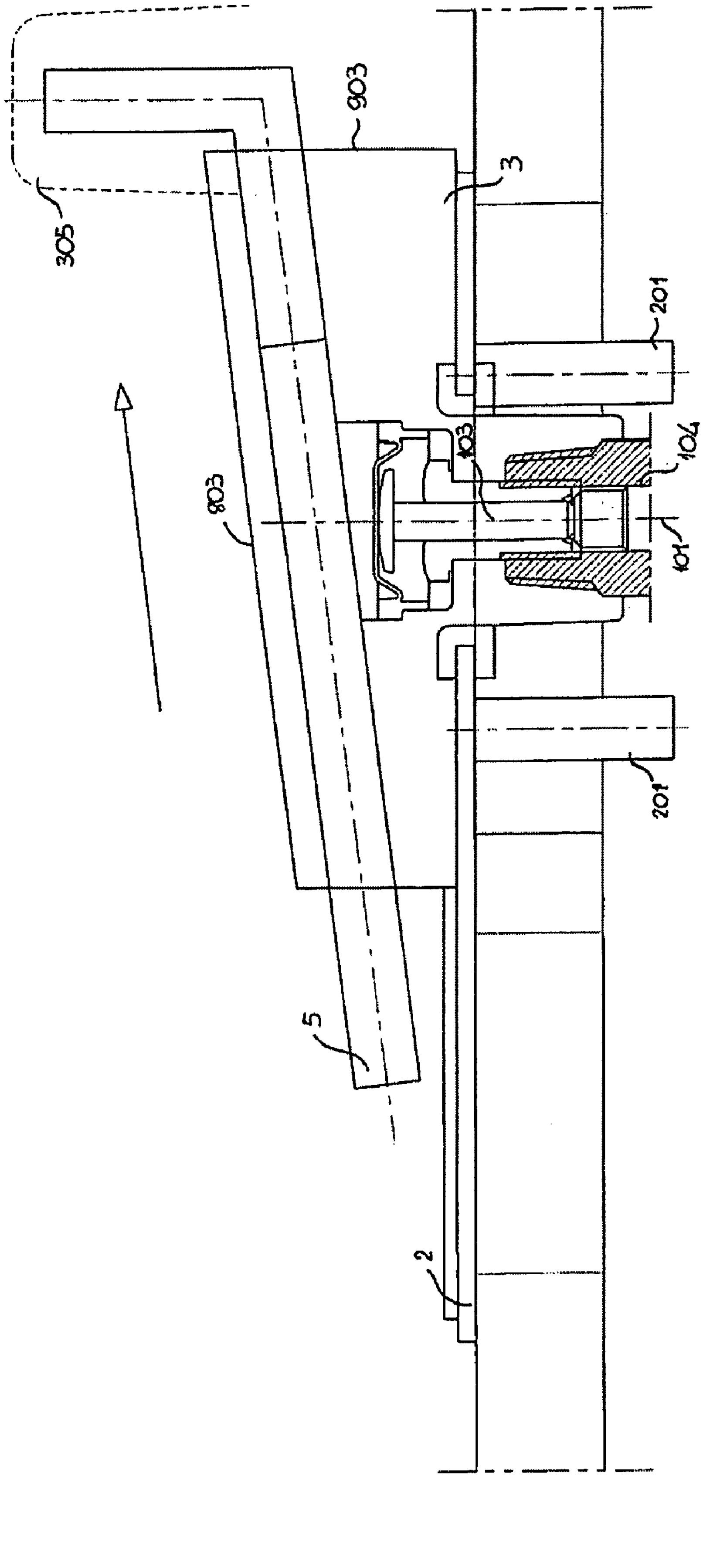

The device shown in FIGS. 7 and 8 is like the device of FIGS. 1 to 4, except for a lever which is slidably mounted rather than pivotally hinged. In such configuration, the rotating body 3 has a truncated-pyramid shape with a cross section tapering from top to bottom. Inside the body 3 there is provided a groove 113 oriented substantially in the same direction as the sloping of the surface 803 that delimits the body 3 laterally, such that its projection would intersect the fixed support 2 in the lower part. Inside the groove 113 is slidably fitted the lever 5, such that the lever 5 can be arranged between a completely deployed position such as that shown in FIG. 7, in which the groove 113 is almost completely disengaged from the lever 5, and a completely withdrawn position such as that shown in FIG. 8. In the position illustrated in FIG. 8, the L-shaped handle 305 abuts against the upper surface 903 of the body 3 and a part of the opposite end extends from the groove 113 in a direction that would interfere with the support 2. The lever 5 and the support 3 have such dimensions that, when in the completely withdrawn position, the lever 5 does not interfere with the support 2, but a slight interference can be provided with a slot of the support 2 such to effectively lock the lever in the not-operative position.

Figure 9:
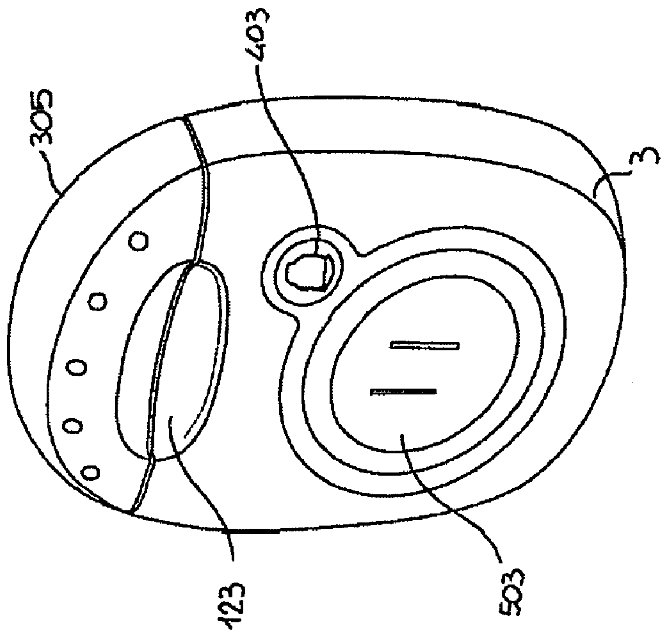
FIGS. 9 and 10 are perspective views of a fourth embodiment of the invention showing the device lever in operative and non-operative positions.
Figure 10:
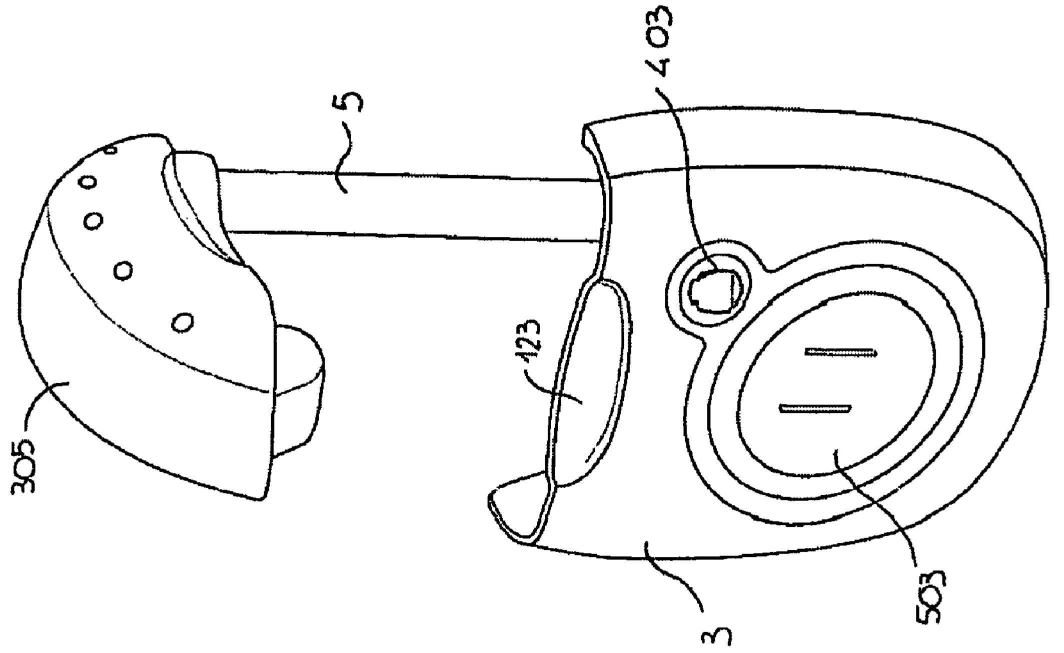

The device shown in FIGS. 9 and 10 is a variant of the above described device. In this embodiment, the lever 5 is completely housed into the rotating support 3. The lever 5 has a handle 305 with a shape that is complementary to the shape of the rotating support 3, to be harmonically joined with the rotating support 3 when it is in the withdrawn position and to provide both an effective technical and aesthetically pleasing result. In order to give the user a wider support surface, the handle 305 can be oriented, in particular can be substantially rotated at 90°, such that the handle 305 can be arranged within a plane substantially orthogonal with respect to a longitudinal section plane of the device, reaching the operative position shown in FIG. 10.

The lever 5 can be easily extended by a user by acting on the indentation 123 after using the release button 403. As an alternative or in combination, means for automatically extending the lever 5 can be provided, for example, a snap mechanism and a releasable spring coupled to the same button 403. The lever 305 is hiddenly inserted inside the housing of the body of the support 3 against the action of a spring, enabling the lever 305 to be releasably deployed when the spring is released by acting on the button 403. Even in this embodiment, the button 503 may be provided, which causes the motor to be accelerated when in the neutral condition. With reference to the FIGS. 9 and 10, such a button may be advantageously placed in the center of the rotating support 3, while the smaller lever-releasing button 403 may be placed at a side thereof, near the end where the lever 5 extends.

While the invention has been described in connection with a number of embodiments, it is not intended to limit the scope of the invention to the particular forms set forth, but on the contrary, it is intended to cover such alternatives, modifications, and equivalents as may be included within the scope of the invention.

What is claimed is:

1. A control device comprising:

a control member regulating operating conditions of an operating unit, the control member being movable along a predetermined path and for a predetermined range between two extreme stop positions, the control member comprising a handle extension movable between an operative position, wherein the handle extension is deployed, and a non-operative position, wherein the handle extension is disposed within at least a portion of the control member, thereby reducing overall dimensions of the control member;

a first part fixedly couplable to a support structure; and a second part rotatably coupled to the first part, an angular displacement of the second part in relation to the first part determining a corresponding change in the operating conditions of the operating unit, the handle extension being coupled to the second part and acting as a lever when in the operative position, wherein the control device is couplable to a linkage, a tie rod system, or a displacement, position, electric, or electronic sensor, by which a movement of the control member regulates the operating conditions of the operating unit, wherein the handle extension is coupled with a hinge to one end of the second part, thereby providing an open and closed position in relation to the second part, wherein the non-operative position corresponds to the closed position in which the handle extension is disposed on the second part, and wherein the operative position corresponds to the open position in which the handle extension extends outwardly and is operable as the lever.

2. The control device according to claim 1, wherein the handle extension in the closed position is disposed in a groove defined on the second part.

3. The control device according to claim 1, further comprising releasably engaging means for stopping a reciprocal movement of the second part and of the handle extension in one or more positions.

4. The control device according to claim 3, wherein the mutual movement is releasably stopped at least in the closed position.

5. The control device according to claim 3, wherein the releasably engaging means comprise a tooth engaging a mating slot in the hinge and a button for disengaging the tooth.

6. The control device according to claim 5, wherein the button is disposed on the handle extension.

7. The control device according to claim 5, wherein the button is disposed on the movable part.

8. The control device according to claim 7, wherein a slot is provided on the handle extension for reaching the button in the closed position.

9. The control device according to claim 1, wherein the second part and the handle extension are slidably coupled, thereby enabling the handle extension to assume intermediate positions between the operative and the non-operative positions, wherein in the non-operative position the handle extension is completely or partially contained within the second part, and wherein in the operative position the handle extension is completely or partially extended outwardly of the second part.

10. The control device according to claim 9, wherein the second part includes a housing having an inlet, and wherein the handle extension slidably reciprocates out of and into the housing through the inlet when moving between the non-operative and the operative positions.

11. The control device according to claim 10, wherein the housing is sized to partially receive the handle extension in the non-operative position, and wherein the housing has an open end opposite to the inlet, the open end allowing the handle extension to extend outwardly of the housing.

12. The control device according to claim 10, wherein the housing is sized to completely receive the handle extension in the non-operative position, and wherein the device comprises means for allowing the handle extension to be extended outwardly from the housing.

13. The control device according to claim 12, wherein the means for allowing comprise a snap mechanism with a releasable spring, and wherein the handle extension is completely received into the housing against the action of the releasable spring.

14. The control device according to claim 13, further comprising a button for releasing the snap mechanism, thereby enabling the handle extension to extend outwardly.

15. The control device according to claim 13, wherein the handle extension comprises a handle shaped complementarily to the second part, thereby providing the handle with an aesthetically pleasing joint with the second part in the non-operative position.

16. The control device according to claim 15, wherein the handle is rotatable, thereby providing a user with a wider support surface.

17. The control device according to claim 1, wherein the handle extension is a telescopically deployable lever receivable into a housing of the second part, the housing having a longitudinal dimension less than a longitudinal extension of the telescopically deployable lever.

18. The control device according to claim 1, wherein the first part comprises a housing configured to receive an insert of the handle extension, the insert preventing the second part from rotating in relation to the first part when the handle extension is in the non-operative position.

19. The control device according to claim 1, wherein the operating unit is one or more motors which are regulated by a single control member, wherein the single control member transmits both acceleration and deceleration controls, and further transmits controls driving a motor shift through a mechanism coupled to the control member, and wherein the control device further comprises a button for disengaging the control member from the mechanism, thereby allowing the one or more motors to be accelerated and decelerated when in the neutral condition.

20. The control device according to claim 1, wherein the operating unit is one or more motors which are regulated by at least two control members, and wherein the at least two control members transmit acceleration and deceleration controls and further transmit controls driving the motor shift through control transmitting mechanisms coupled to the at least two control members.

21. The control device according to claim 1, further comprising means for locking the handle extension when in the operative position and for regulating motor shift, throttle position or acceleration position when the operating unit is in neutral, wherein the means for locking are automatic.

22. A control system for a motor of a boat comprising:

a control device comprising, a control member regulating operating conditions of one or more motors, the control member being movable along a predetermined path and for a predetermined range between two extreme stop positions, the control member comprising a handle extension movable between an operative position, wherein the handle extension is deployed, and a non-operative position, wherein the handle extension is disposed within at least a portion of the control member, thereby reducing overall dimensions of the control member, wherein the control device is couplable to a linkage, a tie rod system, or a displacement, position, electric, or electronic sensor, by which a movement of the control member regulates the operating conditions of the one or more motors; and one or more of mechanical, electromechanical, or fluid dynamic means for transferring control or controls from the control device to one or more elements regulating the one or more motors, wherein the one or more elements regulating the one or more motors act on one or more of a throttle valve regulating acceleration and deceleration of the one or more motors, or on a motor shift regulating a coupling between the one or more motors and one or more propeller shafts, wherein the handle extension comprises a single lever controlling acceleration and deceleration of the one or more motors and further controlling a shift of the one or more motors, and wherein the control device comprises a button configured to disengage the lever from a mechanism transmitting control to the motor shift, thereby allowing the one or more motors to be accelerated and decelerated when in neutral condition.

23. The control system according to claim 22, wherein the control member comprises two levers independently controlling acceleration, deceleration and shift of the one or more motors.

24. A boat comprising:

a control system for a boat motor comprising, a control device comprising, a control member regulating operating conditions of the motor, the control member being movable along a predetermined path and for a predetermined range between two extreme stop positions, the control member comprising a handle extension movable between an operative position, wherein the handle extension is deployed, and a non-operative position, wherein the handle extension is disposed within at least a portion of the control member, thereby reducing overall dimensions of the control member, wherein the control device is couplable to a linkage, a tie rod system, or a displacement, position, electric, or electronic sensor, by which a movement of the control member regulates the operating conditions of the motor; and one or more of mechanical, electromechanical, or fluid dynamic means for transferring control or controls from the control device to one or more elements regulating the motor, wherein the one or more elements regulating the motor act on one or more of a throttle valve regulating acceleration and deceleration of the motor, or on a motor shift regulating a coupling between the motor and one or more propeller shafts, wherein the handle extension comprises a single lever controlling acceleration and deceleration of the motor and further controlling a shift of the motor, and wherein the control device comprises a button configured to disengage the lever from a mechanism transmitting control to the motor shift, thereby allowing the motor to be accelerated and decelerated when in neutral condition.

25. The boat according to claim 24, wherein the boat is a sailboat having one or more motors controlled by the control device, and wherein the control device is placed in the boat cockpit.

* * * * *